(12) United States Patent
Koo et al.

(10) Patent No.: US 12,210,177 B2
(45) Date of Patent: Jan. 28, 2025

(54) POLARIZING PLATE AND OPTICAL DISPLAY DEVICE COMPRISING SAME

(71) Applicant: Samsung SDI Co., Ltd., Yongin-si (KR)

(72) Inventors: Jun Mo Koo, Suwon-si (KR); Bong Choon Kim, Suwon-si (KR); Dong Yoon Shin, Suwon-si (KR); Jung Hun You, Suwon-si (KR); Sang Hum Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 508 days.

(21) Appl. No.: 17/632,213

(22) PCT Filed: Aug. 7, 2020

(86) PCT No.: PCT/KR2020/010488
§ 371 (c)(1),
(2) Date: Feb. 1, 2022

(87) PCT Pub. No.: WO2021/029626
PCT Pub. Date: Feb. 18, 2021

(65) Prior Publication Data
US 2022/0276424 A1  Sep. 1, 2022

(30) Foreign Application Priority Data
Aug. 12, 2019 (KR) .................. 10-2019-0098474

(51) Int. Cl.
*G02B 5/30* (2006.01)
*G02F 1/1335* (2006.01)

(52) U.S. Cl.
CPC ........... *G02B 5/3083* (2013.01); *G02B 5/305* (2013.01); *G02F 1/133528* (2013.01)

(58) Field of Classification Search
CPC . G02B 5/305; G02B 5/3083; G02F 1/133528; G02F 1/133634; G02F 1/133638
(Continued)

(56) References Cited

U.S. PATENT DOCUMENTS 9,164,213 B2 * 10/2015 Yaginuma ............ G02B 5/3016
10,816,708 B2 * 10/2020 Iida ...................... H10K 50/868
(Continued)

FOREIGN PATENT DOCUMENTS

CN    101210973 A    7/2008
CN    104181727 A    12/2014
(Continued)

OTHER PUBLICATIONS

Korean Office Action dated Dec. 30, 2022 issued in corresponding Korean Application No. 10-2019-0098474 (5 pages).
(Continued)

*Primary Examiner* — Ricky D Shafer
(74) *Attorney, Agent, or Firm* — Lewis Roca Rothgerber Christie LLP (57) ABSTRACT

Provided is a polarizing plate and an optical display device comprising same, the polarizing plate comprising: a polarizer; and a stack body of a first phase difference layer and a second phase difference layer stacked on a lower surface of the polarizer, wherein the first phase difference layer satisfies Equation 1, the second phase difference layer satisfies Equation 2, the sum of an in-plane phase difference at a wavelength of 550 nm between the first phase difference layer and the second phase difference layer is about 100 nm to about 110 nm, the sum of a thickness direction phase difference at a wavelength of 550 nm between the first phase difference layer and the second phase difference layer is
(Continued)

about −30 nm to about +10 nm, and the second phase difference layer comprises a fluorine-based phase difference layer.

17 Claims, 1 Drawing Sheet

(58) Field of Classification Search
USPC ............ 359/483.01, 489.01, 489.12, 489.13, 359/489.07
See application file for complete search history.

(56) References Cited

U.S. PATENT DOCUMENTS

| | | |
|---|---|---|
| 2008/0151166 A1 | 6/2008 | Takemoto |
| 2008/0170294 A1 | 7/2008 | Kuroda et al. |
| 2013/0301129 A1 | 11/2013 | In et al. |
| 2014/0347613 A1 | 11/2014 | Kim et al. |
| 2015/0168624 A1 | 6/2015 | Yaginuma et al. |
| 2016/0291373 A1* | 10/2016 | Iida ..................... G02F 1/13363 |
| 2016/0349413 A1* | 12/2016 | Nakata ................. G02B 5/3083 |
| 2019/0227364 A1* | 7/2019 | Kawamura ....... G02F 1/133634 |
| 2019/0331838 A1* | 10/2019 | Konno ...................... B32B 7/02 |
| 2019/0369315 A1 | 12/2019 | Endo et al. |
| 2020/0012147 A1 | 1/2020 | Osato et al. |

FOREIGN PATENT DOCUMENTS

| | | |
|---|---|---|
| CN | 106019684 A | 10/2016 |
| CN | 107924012 A | 4/2018 |
| CN | 109477926 A | 3/2019 |
| JP | 2012-177907 A | 9/2012 |
| JP | 2013-152430 A | 8/2013 |
| KR | 2001-0033765 A | 4/2001 |
| KR | 10-2008-0034405 A | 4/2008 |
| KR | 10-2014-0137018 A | 12/2014 |
| KR | 2014-0146921 A | 12/2014 |
| KR | 10-2017-0097597 A | 8/2017 |
| KR | 10-2017-0115996 A | 10/2017 |
| KR | 10-2017-0121987 A | 11/2017 |
| KR | 10-2018-0039649 A | 4/2018 |
| KR | 10-1937447 | 1/2019 |
| KR | 10-1937447 B | 1/2019 |
| KR | 10-2019-0062549 A | 6/2019 |
| WO | WO 2013/191152 A1 | 12/2013 |

OTHER PUBLICATIONS

Chinese Office Action dated Jan. 20, 2024, issued in corresponding Chinese Patent Application No. 202080056810.2 (8 pages).
International Search Report of PCT/KR2020/010488, Nov. 13, 2020, 5 pages.

* cited by examiner

POLARIZING PLATE AND OPTICAL DISPLAY DEVICE COMPRISING SAME

CROSS-REFERENCE TO RELATED APPLICATIONS

This application is a U.S. National Phase Patent Application of International Application Number PCT/KR2020/010488, filed on Aug. 7, 2020, which claims priority of Korean Patent Application Number 10-2019-0098474, filed on Aug. 12, 2019, the entire content of each of which is incorporated herein by reference.

TECHNICAL FIELD

The present invention relates to a polarizing plate and an optical display apparatus including the same. More particularly, the present invention relates to a polarizing plate that includes a retardation layer not suffering from breakage in fabrication of the polarizing plate to provide good processability and has good diagonal compensation and thermal stability, and an optical display apparatus including the same.

BACKGROUND ART

A liquid crystal display includes a liquid crystal panel, a viewer-side polarizing plate mounted on one surface of the liquid crystal panel, and a light source-side polarizing plate mounted on the other surface thereof. The liquid crystal panel includes a liquid crystal layer. Despite good front visibility, a liquid crystal panel including an in-plane switching (IPS) liquid crystal layer or a fringe field switching (FFS) crystal layer has poor screen visibility at a diagonal angle. To address this problem, the viewer-side polarizing plate or the light source-side polarizing plate requires a retardation layer.

In recent years, with the trend of reducing the thickness of the polarizing plate, an attempt has been made to provide a liquid crystal layer to a retardation layer. However, the liquid crystal layer has brittle properties, causing deterioration in durability of the polarizing plate. As the retardation layer, particularly as a positive B (B+) plate, an acrylic film is generally used in the art. The acrylic film has an advantage of allowing easy realization of refractive indexes nx, ny and nz of the positive B plate. However, addition of additives to prevent breakage of the acrylic film provides problems, such as increase in price and decrease in compatibility. However, as a use environment of the polarizing plate becomes severe, the polarizing plate requires thermal stability.

The background technique of the present invention is disclosed in Korean Patent Registration No. 10-1937447.

DISCLOSURE

Technical Problem

It is one object of the present invention to provide a polarizing plate that includes a retardation layer not suffering from breakage in fabrication thereof.

It is another object of the present invention to provide a polarizing plate that has good diagonal compensation and thermal stability when applied to a liquid crystal display.

It is a further object of the present invention to provide a polarizing plate that has a good effect in thickness reduction.

Technical Solution

One aspect of the present invention relates to a polarizing plate.

1. The polarizing plate includes: a polarizer; and a laminate of a first retardation layer and a second retardation layer stacked on a lower surface of the polarizer, wherein the first retardation layer satisfies Equation 1 and the second retardation layer satisfies Equation 2:

$$nx > ny > nz, \quad [\text{Equation 1}]$$

wherein Equation 1, nx, ny and nz are indexes of refraction of the first retardation layer at a wavelength of 550 nm in a slow axis direction, a fast axis direction and a thickness direction thereof, respectively, $$nz > nx > ny, \quad [\text{Equation 2}]$$

wherein Equation 2, nx, ny and nz are indexes of refraction of the second retardation layer at a wavelength of 550 nm in a slow axis direction, a fast axis direction and a thickness direction thereof, respectively, a sum of in-plane retardation values of the first retardation layer and the second retardation layer at a wavelength of 550 nm ranges from about 100 nm to about 110 nm, a sum of out-of-plane retardation values of the first retardation layer and the second retardation layer at a wavelength of 550 nm ranges from about −30 nm to about +10 nm, and the second retardation layer includes a fluorene-based retardation layer.

2. In 1, the second retardation layer may be directly formed on the first retardation layer.

3. In 1 to 2, the second retardation layer may have a slow axis tilted at an angle of about −5° to about +5°, assuming that the first retardation layer has a slow axis disposed at an angle of 0°.

4. In 1 to 3, the second retardation layer may have an in-plane retardation value of about 50 nm to about 60 nm and an out-of-plane retardation value of about −150 nm to about −120 nm at a wavelength of 550 nm.

5. In 1 to 4, the second retardation layer may have a degree of biaxiality of about −3 to about 0 at a wavelength of 550 nm.

6. In 1 to 5, the second retardation layer may satisfy relations about 1.0≤Re(450)/Re(550)≤about 1.2 and about 0.85≤Re(650)/Re(550)≤about 1.0, where Re(450), Re(550), and Re(650) denote in-plane retardation values at wavelengths of 450 nm, 550 nm, and 650 nm, respectively.

7. In 1 to 6, the second retardation layer may have an nx value of about 1.59 to about 1.61, an ny value of about 1.59 to about 1.61, and an nz value of about 1.61 to about 1.63 in Equation 2.

8. In 1 to 7, the second retardation layer may include a fluorene-based ring-containing resin and an aromatic thermoplastic resin.

9. In 1 to 8, the second retardation layer may have a slow axis tilted at an angle of about 87° to about 93°, assuming that the polarizer has an absorption axis disposed at an angle of 0°.

10. In 1 to 9, the first retardation layer may have an in-plane retardation value of 50 nm to 60 nm and an out-of-plane retardation value of 120 nm to 150 nm at a wavelength of 550 nm.

11. In 1 to 10, the first retardation layer may satisfy relations: about 1.0≤Re(450)/Re(550)≤about 1.2 and about 0.85≤Re(650)/Re(550)≤about 1.0, where Re(450), Re(550), and Re(650) denote in-plane retardation values at wavelengths of 450 nm, 550 nm, and 650 nm, respectively.

12. In 1 to 11, the first retardation layer may include a cyclic olefin polymer film.

13. In 1 to 12, the first retardation layer may have an nx value of about 1.50 to about 1.55, an ny value of about 1.48 to about 1.53, and an nz value of about 1.48 to about 1.53 in Equation 1.

14. In 1 to 13, the first retardation layer and the second retardation layer may be sequentially stacked on the polarizer, or the second retardation layer and the first retardation layer may be sequentially stacked on the polarizer.

15. In 1 to 14, the polarizing plate may further include a protective film stacked on an upper surface of the polarizer.

Another aspect of the present invention relates to an optical display apparatus including the polarizing plate according to the present invention.

Advantageous Effects

The present invention provides a polarizing plate that includes a retardation layer not suffering from breakage in fabrication thereof.

The present invention provides a polarizing plate that has good diagonal compensation and thermal stability when applied to a liquid crystal display.

The present invention provides a polarizing plate that has a good effect on thickness reduction.

BEST MODEL

Embodiments of the present invention will be described in detail with reference to the accompanying drawings such that the present invention can be easily implemented by those skilled in the art. It should be understood that the present invention may be embodied in different ways and is not limited to the following embodiments. In the drawings, portions irrelevant to the description will be omitted for clarity. Like components will be denoted by like reference numerals throughout the specification. Although lengths, thicknesses or widths of various components may be exaggerated for understanding in the drawings, it should be understood that the present invention is not limited thereto.

Herein, spatially relative terms such as "upper" and "lower" are defined with reference to the accompanying drawings. Thus, it will be understood that the term "upper surface" can be used interchangeably with the term "lower surface".

Herein, "in-plane retardation Re", "out-of-plane retardation Rth", and "degree of biaxiality NZ" are represented by Equations A, B and C, respectively:

$$Re = (nx - ny) \times d, \quad \text{[Equation A]}$$

$$Rth = ((nx + ny)/2 - nz) \times d, \quad \text{[Equation B]}$$

$$NZ = (nx - nz)/(nx - ny), \quad \text{[Equation C]}$$

where nx, ny, and nz are indexes of refraction of a corresponding optical device in the slow axis direction, the fast axis direction and the thickness direction of the optical device at a measurement wavelength, respectively, and d is the thickness of the optical device (unit: nm). In Equations A to C, the measurement wavelength may be 450 nm, 550 nm or 650 nm.

Herein, "short wavelength dispersion" refers to Re(450)/Re(550), and "long wavelength dispersion" refers to Re(650)/Re(550), wherein Re(450), Re(550), and Re(650) refer to in-plane retardation (Re) values of a single retardation layer or a laminate of retardation layers at wavelengths of about 450 nm, 550 nm, and 650 nm, respectively.

As used herein to represent an angle, "+" means a counterclockwise direction about a reference point, and "−" means a clockwise direction about the reference point.

As used herein to represent a specific numerical range, the expression "X to Y" means "X≤ and ≤Y".

The inventors of the present invention invented a polarizing plate formed by stacking a first retardation layer and a second retardation layer on one surface of the polarizer, in which the second retardation layer includes a fluorene-based retardation layer, while controlling retardation values of the first and second retardation layers and the sum of the retardation values of the first and second retardation layers. With this structure, the retardation layers of the polarizing plate do not suffer from breakage in fabrication of the polarizing plate, thereby improving processability, diagonal compensation and screen quality of an optical display apparatus including the polarizing plate, and thermal stability of the polarizing plate or the entirety of the first retardation layer and the second retardation layer without brightness loss.

Herein, "thermal stability" means that an absolute value of variation in out-of-plane retardation (Rth) value of the entirety of the first retardation layer and the second retardation layer is 10 nm or less and the polarizing plate exhibits less variation in brightness in a black mode upon treatment of the polarizing plate or the entirety of the first retardation layer and the second retardation layer at 60° C. and 95% RH (relative humidity) for 500 hours. Details of measurement will be described in examples.

Hereinafter, a polarizing plate according to one embodiment of the present invention will be described with reference to FIG. 1.

Figure 1:
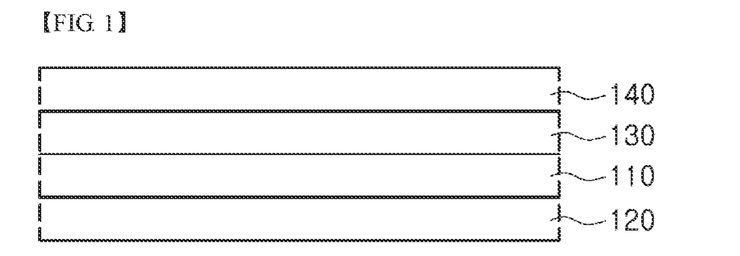
FIG. 1 is a sectional view of a polarizing plate according to one embodiment of the present invention.

Referring to FIG. 1, the polarizing plate includes a polarizer 130, a protective film 140 stacked on an upper surface of the polarizer 130, and a first retardation layer 110 and a second retardation layer 120 sequentially stacked on a lower surface of the polarizer 130.

In one embodiment, the protective film is stacked on a light exit surface of the polarizer, and the first retardation layer and the second retardation layer are stacked on a light incidence surface of the polarizer.

In another embodiment, the protective film is stacked on the light incidence surface of the polarizer, and the first retardation layer and the second retardation layer are stacked on the light exit surface of the polarizer.

The second retardation layer 120 is stacked on the lower surface of the polarizer to protect the polarizer from an external environment while improving mechanical properties of the polarizing plate. Although not shown in FIG. 1, an adhesive layer, a bonding layer or an adhesive/bonding layer is further formed on a lower surface of the second retardation layer such that the polarizing plate can be adhesively attached to an optical member (for example: a panel for liquid crystal displays and the like). The adhesive layer, the bonding layer or the adhesive/bonding layer may be formed by a typical method known to those skilled in the art.

The second retardation layer 120 includes a fluorene-based retardation layer, which is a non-crystal layer. The "fluorene-based retardation layer" means that at least one of base resins forming the second retardation layer includes a fluorene-based unit.

The "fluorene-based" means a moiety represented by Formula 1, as well-known to those skilled in the art. In Formula 1, a substituent group is omitted. With the fluorene-based retardation layer, the second retardation layer can improve processability and economic feasibility in fabrication of the polarizing plate without breakage, as compared with a second retardation layer formed of a typical acrylic film.

[Formula 1]

In one embodiment, the second retardation layer is the fluorene-based retardation layer and is constituted by a single layer. Herein, "single layer" means that the second retardation layer consists of the fluorene-based retardation layer and does not include an additional retardation layer on one or both surfaces thereof.

The fluorene-based retardation layer may be formed of a composition including at least one base resin containing the fluorene-based moiety described above.

In one embodiment, the fluorene-based retardation layer is a non-acrylic retardation layer and may be formed of a retardation layer composition including a fluorene-based ring-containing resin and an aromatic thermoplastic resin.

The fluorene-based retardation layer may include a simple mixture of the fluorene-based ring-containing resin and the aromatic thermoplastic resin (meaning a non-reacted state), or a reaction product of the fluorene-based ring-containing resin and the aromatic thermoplastic resin. Preferably, the fluorene-based retardation layer includes the simple mixture of these two types of resins, thereby improving optical transparency of the second retardation layer through stable phase separation of the two types of resins.

In one embodiment, the fluorene-based ring-containing resin may include a fluorene-based ring-containing polyester. The fluorene-based ring-containing polyester may be formed through esterification of dicarboxylic acid and a diol. The dicarboxylic acid may include fluorene dicarboxylic acid having a carboxylic acid group coupled to the number 9 carbon of a fluorene-based ring through a hydrocarbon group (for example: alkylene group).

In one embodiment, the fluorene-based dicarboxylic acid may include at least one selected from the group of Formula 2 and Formula 3, without being limited thereto:

[Formula 2]

[Formula 3]

Wherein Formula 2 and Formula 3, $R^1$ and $R^2$ are each independently a monovalent substituent group; k, m, and n are each independently an integer of 0 to 4; and $X^1$ and $X^2$ are each independently a bivalent hydrocarbon group.

$R^1$ and $R^2$ may be each independently a cyano group, a halogen, a $C_1$ to $C_{10}$ alkyl group, or a $C_6$ to $C_{10}$ aryl group. $X^1$ and $X^2$ may be each independently a linear or branched $C_1$ to $C_{10}$ alkylene group. $R^1$, $R^2$, $X^1$, and $X^2$ may be each independently substituted with at least one selected from the group of a $C_1$ to $C_{10}$ alkyl group, a $C_6$ to $C_{10}$ aryl group, and a $C_3$ to $C_{10}$ cycloalkyl group.

In one embodiment, the fluorene-based dicarboxylic acid may include at least one 9,9-bis(carboxy $C_2$ to $C_6$ alkyl) fluorene, such as 9,9-bis(2-carboxyethyl)fluorene, 9,9-bis(2-carboxypropyl)fluorene, and the like.

The dicarboxylic acid may further include other dicarboxylic acids (non-fluorene-based dicarboxylic acids) free from a fluorene-based moiety so as not to affect the effects of the present invention. For example, the non-fluorene-based dicarboxylic acid may include at least one selected from the group of an aromatic dicarboxylic acid, a polycyclic aromatic dicarboxylic acid, and an aliphatic dicarboxylic acid, without being limited thereto.

The fluorene-based dicarboxylic acid may be present in an amount of about 10 mol % or more, preferably about 90 mol % to about 100 mol %, based on the total amount of the dicarboxylic acid. Within this range, the fluorene-based dicarboxylic acid can secure the advantageous effects of the present invention.

The diol may include 9,9-bisarylfluorene ring-containing diol in which an alcohol group is coupled to the No. 9 carbon of the fluorene ring through a hydrocarbon group (for example: an arylene group). The 9,9-bisarylfluorene ring-containing diol may be represented by Formula 4, without being limited thereto:

[Formula 4]

wherein Formula 4, Z is an aromatic hydrocarbon group: $R^3$ and $R^4$ are each independently a monovalent substituent group; p is an integer of 0 to 4; $R^5$ is an alkylene group; and q and r are each independently an integer of 0 or 1 or more.

In Formula 4, Z denotes a monocyclic aromatic hydrocarbon group, such as a phenyl group and the like, and a polycyclic aromatic hydrocarbon group, such as a naphthalene group, an anthracene group, a biphenyl group, and the like. $R^3$ may be a cyano group, a halogen, a $C_1$ to $C_{10}$ alkyl group, or a $C_6$ to $C_{10}$ aryl group; and $R^4$ is a halogen, a linear or branched $C_1$ to $C_{10}$ alkyl group, a $C_6$ to $C_{20}$ aryl group, a $C_7$ to $C_{20}$ arylalkyl group, a $C_1$ to $C_{10}$ alkoxy group, a $C_1$ to $C_{10}$ alkylthio group, a $C_6$ to $C_{10}$ arylthio group, a $C_2$ to $C_{10}$ acyl group, a nitro group, a cyano group, an amino group, or the like, without being limited thereto. $R^5$ may be a linear or branched $C_2$ to $C_{10}$ alkylene group.

In one embodiment, the 9,9-bisarylfluorene ring-containing diol may include at least one of 9,9-bis(hydroxy-alkylphenyl)fluorene, such as 9,9-bis(hydroxyphenyl)fluorene, 9,9-bis(hydroxymethylphenyl)fluorene, 9,9-bis(hydroxyisopropylphenyl)fluorene, 9,9-bis(hydroxydimethylphenyl)fluorene, and the like, 9,9-bis(hydroxyarylphenyl)fluorene, such as 9,9-bis(hydroxyphenylphenyl)fluorene and the like, and 9,9-bis(hydroxynaphthyl)fluorene, without being limited thereto.

The diol may further include at least one type of diol free from a fluorene group (non-fluorene-based diol) so as not to affect the effects of the present invention. For example, the non-fluorene-based diol may include at least one of alkane diol, alkylene glycol, and polyalkylene glycol, without being limited thereto.

The fluorene-based ring-containing polyester may be prepared through esterification of the dicarboxylic acid and the diol. Esterification may be performed through esterification of an acid and an alcohol known to those skilled in the art.

The aromatic thermoplastic resin may include at least one selected from among an aromatic polyether, an aromatic polyester, an aromatic polycarbonate, and an aromatic polyamide, preferably an aromatic polycarbonate. Preferably, the aromatic thermoplastic resin includes an aromatic polycarbonate to improve compatibility with the fluorene-based ring-containing dicarboxylic acid.

Relative to a total of 100 parts by weight of the fluorene-based ring-containing resin and the aromatic thermoplastic resin, the fluorene ring-containing resin may be present in an amount of about 50 parts by weight to about 90 parts by weight and the aromatic thermoplastic resin may be present in an amount of about 10 parts by weight to about 50 parts by weight. Within these ranges, the fluorene ring-containing resin and the aromatic thermoplastic resin can efficiently realize desired stability and retardation of the second retardation layer according to the present invention.

For example, the fluorene ring-containing resin may be present in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 or 90 parts by weight, relative to a total of 100 parts by weight of the fluorene-based ring-containing resin and the aromatic thermoplastic resin.

The retardation layer composition may further include typical additives, such as a plasticizer, a stabilizer, a flame retardant, an antistatic agent, fillers, a foaming agent, an antifoaming agent, a lubricant, a release agent, and the like, in addition to the fluorene-based ring-containing resin and the aromatic thermoplastic resin.

The second retardation layer may have a thickness of about 10 μm to about 60 μm, preferably about 20 μm to about 40 μm. Within this range, the second retardation layer allows reduction in thickness of the polarizing plate, can be used in the polarizing plate, and can secure uniform retardation in a film.

The second retardation layer can be formed of the retardation layer composition. Formation of the second retardation layer will be described in detail below.

According to the present invention, the second retardation layer includes the fluorene-based retardation layer to prevent embrittlement and breakage of the second retardation layer, as compared with the case where a liquid crystal layer or an acrylic film is used as the second retardation layer in the art, and retardation values of each of the first retardation layer and the second retardation layer and the entirety of the first and second retardation layers are controlled to improve a diagonal compensation function of the polarizing plate while significantly improving overall thermal stability of the polarizing plate. Next, retardation of each of the first retardation layer and the second retardation layer will be described in detail.

The first retardation layer 110 is stacked on the lower surface of the polarizer to protect the polarizer from an external environment while improving mechanical properties of the polarizing plate.

The first retardation layer 110 is a negative B plate and may satisfy Equation 1 to improve the diagonal compensation function of the polarizing plate together with the second retardation layer while assisting in prevention of brightness loss:

$$nx>ny>nz,\qquad\text{[Equation 1]}$$

wherein Equation 1, nx, ny and nz are indexes of refraction of the first retardation layer at a wavelength of 550 nm in a slow axis direction, a fast axis direction and a thickness direction thereof, respectively.

In Equation 1, the first retardation layer may have an nx value of about 1.50 to about 1.55, preferably about 1.51 to about 1.54, an ny value of about 1.48 to about 1.53, preferably about 1.49 to about 1.52, and an nz value of about 1.48 to about 1.53, preferably about 1.49 to about 1.52. Within this range, the first retardation layer can secure improvement in lateral contrast ratio.

For example, the first retardation layer may have an nx value of about 1.50, 1.51, 1.52, 1.53, 1.54 or 1.55 in Equation 1. For example, the first retardation layer may have an ny value of about 1.48, 1.49, 1.50, 1.51, 1.52 or 1.53 in Equation 1. For example, the first retardation layer may have an nz value of about 1.48, 1.49, 1.50, 1.51, 1.52 or 1.53 in Equation 1.

The first retardation layer 110 may have an in-plane retardation value of about 50 nm to about 60 nm and an out-of-plane retardation value of about 120 nm to about 150 nm at a wavelength of 550 nm. Within this range, the laminate of the first retardation layer and the fluorene-based retardation layer can easily achieve the sum of in-plane retardation values and the sum of out-of-plane retardation values according to the present invention. Preferably, the first retardation layer has an in-plane retardation value of about 52 nm to about 57 nm and an out-of-plane retardation value of about 120 nm to about 135 nm. For example, the first retardation layer may have an in-plane retardation value of about 50 nm, 51 nm, 52 nm, 53 nm, 54 nm, 55 nm, 56 nm, 57 nm, 58 nm, 59 nm, or 60 nm at a wavelength of 550 nm. For example, the first retardation layer may have an out-of-plane retardation value of about 120 nm, 121 nm, 122 nm, 123 nm, 124 nm, 125 nm, 126 nm, 127 nm, 128 nm, 129 nm, 130 nm, 131 nm, 132 nm, 133 nm, 134 nm, 135 nm, 136 nm, 137 nm, 138 nm, 139 nm, 140 nm, 141 nm, 142 nm, 143 nm, 144 nm, 145 nm, 146 nm, 147 nm, 148 nm, 149 nm or 150 nm at a wavelength of 550 nm.

The first retardation layer 110 may have a degree of biaxiality of about 1 to about 4, preferably about 1.03 to about 3 at a wavelength of 550 nm. Within this range, the first retardation layer 110 can secure improvement in lateral contrast ratio. For example, the first retardation layer 110 may have a degree of biaxiality of about 1, 1.5, 2, 2.5, 3, 3.5 or 4.

The first retardation layer 110 may include a protective coating layer formed by coating an actinic radiation-curable composition onto a release film, followed by curing. However, in order to facilitate formation of the second retardation layer, the first retardation layer may be a film formed of an optically clear resin.

In one embodiment, the first retardation layer may include a stretched film formed through melt extrusion of an optically clear resin-containing composition, followed by stretching. For example, the polymer resin may include at least one of a polycarbonate resin, a polyester resin including polyethylene terephthalate, polyethylene naphthalate, and the like, a polyamide resin, a polyarylate resin, a polyimide resin, a polyethylene resin, a polyolefin resin including polypropylene and the like, and a cyclic olefin polymer (COP). Preferably, the polymer resin includes a cyclic olefin polymer to secure stable retardation uniformity on a front side of the polarizing plate while reducing variation in retardation in evaluation of durability. The composition may further include typical additives, such as UV stabilizers, antioxidants, and the like, which are known to those skilled in the art.

The first retardation layer 110 may be formed by uniaxially or biaxially stretching a non-stretched film fabricated through melt extrusion of the composition. In uniaxial or biaxial stretching, the non-stretched film may be stretched so as to secure elongation of the first retardation layer. For example, uniaxial stretching of the non-stretched film may be performed by MD (machine direction) uniaxial stretching to an elongation of about 1.5 times to about 3 times an initial length thereof, preferably about 1.8 times to about 2 times. Biaxial stretching of the non-stretched film may be performed by sequential or simultaneous stretching in the MD and the transverse direction (TD) to an MD elongation of about 1.3 times to about 4 times and a TD elongation of about 1.3 times to about 4 times.

The first retardation layer 110 is a stretched film having a slow axis and a fast axis in a plane thereof. In one embodiment, the first retardation layer may have a slow axis tilted at an angle of about −3° to about +3°, preferably about −1° to about +1°, assuming that the MD of the first retardation layer is 0°. Within this range, the first retardation layer 110 can secure improvement in front contrast ratio. For example, the slow axis of the first retardation layer 110 may be tilted at an angle of about −3°, −2°, −1°, 0°, +1°, +2°, or +3°.

In the laminate of the first retardation layer 110 and the second retardation layer, the first retardation layer 110 allows adjustment of visibility on a black screen through adjustment of wavelength dispersion together with the retardation.

In one embodiment, the first retardation layer may have a short wavelength dispersion Re(450)/Re(550) satisfying Relation: about 1.0≤Re(450)/Re(550)≤about 1.2, preferably about 1.05≤Re(450)/Re(550)≤about 1.1. In one embodiment, the first retardation layer may have a long wavelength dispersion Re(650)/Re(550) satisfying Relation: about 0.85≤Re(650)/Re(550)≤about 1.0, preferably about 0.90≤Re(650)/Re(550)≤about 1.0. Within this range, the first retardation layer can further improve visibility on the black screen.

For example, the first retardation layer may have a short wavelength dispersion (Re(450)/Re(550)) of about 1.0, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, or 1.2.

For example, the first retardation layer may have a long wavelength dispersion (Re(650)/Re(550)) of about 0.85, 0.86, 0.87, 0.88, 0.89, 0.90, 0.91, 0.92, 0.93, 0.94, 0.95, 0.96, 0.97, 0.98, 0.99, or 1.0.

The first retardation layer 110 may have a thickness of about 10 μm to about 50 μm, preferably about 15 μm to about 40 μm. Within this range, the first retardation layer 110 can be used in the polarizing plate and can secure uniform retardation in a film. For example, the first retardation layer may have a thickness of about 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, 49 μm, or 50 μm.

In one embodiment, the first retardation layer may be free from one or more heat stabilizers.

The second retardation layer 120 is a negative B plate and may satisfy Equation 2 to improve the diagonal compensation function of the polarizing plate together with the first retardation layer while assisting in prevention of brightness loss:

$$nz > nx > ny,$$ [Equation 2]

wherein Equation 2, nx, ny and nz are indexes of refraction of the second retardation layer at a wavelength of 550 nm in a slow axis direction, a fast axis direction and a thickness direction thereof, respectively.

In Equation 2, the second retardation layer 120 may have an nx value of about 1.59 to about 1.61, preferably about 1.60 to about 1.61, an ny value of about 1.59 to about 1.61, preferably about 1.60 to about 1.61, and an nz value of about 1.61 to about 1.63, preferably about 1.61 to about 1.62. Within this range, the second retardation layer 120 can suppress brightness in a black mode. For example, the second retardation layer may have an nx value of about 1.59, 1.591, 1.592, 1.593, 1.594, 1.595, 1.596, 1.597, 1.598, 1.599, 1.600, 1.601, 1.602, 1.603, 1.604, 1.605, 1.606, 1.607, 1.608, 1.609, or 1.61, in Equation 2. For example, the second retardation layer may have an ny value of about 1.59, 1.591, 1.592, 1.593, 1.594, 1.595, 1.596, 1.597, 1.598, 1.599, 1.600, 1.601, 1.602, 1.603, 1.604, 1.605, 1.606, 1.607, 1.608, 1.609, or 1.61, in Equation 2. For example, the second retardation layer may have an nz value of about 1.61, 1.611, 1.612, 1.613, 1.614, 1.615, 1.616, 1.617, 1.618, 1.619, 1.62, 1.621, 1.622, 1.623, 1.624, 1.625, 1.626, 1.627, 1.628, 1.629, or 1.63, in Equation 2.

The second retardation layer 120 may have an in-plane retardation value of about 50 nm to about 60 nm and an out-of-plane retardation value of about −150 nm to about −120 nm at a wavelength of 550 nm. Within this range, the laminate of the first retardation layer and the second retardation layer can easily achieve the sum of in-plane retardation values and the sum of out-of-plane retardation values according to the present invention. Preferably, the second retardation layer has an in-plane retardation value of about 53 nm to about 58 nm and an out-of-plane retardation value of about −135 nm to about −115 nm.

For example, the second retardation layer may have an in-plane retardation value of about 50 nm, 51 nm, 52 nm, 53 nm, 54 nm, 55 nm, 56 nm, 57 nm, 58 nm, 59 nm, or 60 nm at a wavelength of 550 nm. For example, the second retardation layer may have an out-of-plane retardation value of about −150 nm, −149 nm, −148 nm, −147 nm, −146 nm, −145 nm, −144 nm, −143 nm, −142 nm, −141 nm, −140 nm, −139 nm, −138 nm, −137 nm, −136 nm, −135 nm, −134 nm, −133 nm, −132 nm, −131 nm, −130 nm, −129 nm, −128 nm, −127 nm, −126 nm, −125 nm, −124 nm, −123 nm, −122 nm, −121 nm, or −120 nm at a wavelength of 550 nm.

The second retardation layer may have a degree of biaxiality of about −3 to about 0, preferably about −2.6 to about −1.8, about −2 to about −0.1 at a wavelength of 550 nm. Within this range, the second retardation layer can secure improvement in lateral contrast ratio. For example, the second retardation layer may have a degree of biaxiality of about −3, −2.9, −2.8, −2.7, −2.6, −2.5, −2.4, −2.3, −2.2, −2.1, −2.0, −1.9, −1.8, −1.7, −1.6, −1.5, −1.4, −1.3, −1.2, −1.1, −1.0, −0.9, −0.8, −0.7, −0.6, −0.5, −0.4, −0.3, −0.2, −0.1 or 0 at a wavelength of 550 nm.

The second retardation layer can improve the diagonal compensation function of the polarizing plate together with the first retardation layer by controlling the retardation and wavelength dispersion of the polarizing plate.

In one embodiment, the second retardation layer may have a short wavelength dispersion Re(450)/Re(550) satisfying Relation: about 1.0≤Re(450)/Re(550)≤about 1.2, preferably about 1.1≤Re(450)/Re(550)≤about 1.18. In one embodiment, the second retardation layer may have a long wavelength dispersion Re(650)/Re(550) satisfying Relation: about 0.85≤Re(650)/Re(550)≤about 1.0, preferably about 0.905≤Re(650)/Re(550)≤about 0.95. Within this range, the second retardation layer can secure maximum front black visibility.

For example, the second retardation layer may have a short wavelength dispersion Re(450)/Re(550) of about 1.0, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, or 1.2.

For example, the second retardation layer may have a long wavelength dispersion Re(650)/Re(550) of about 0.85, 0.86, 0.87, 0.88, 0.89, 0.90, 0.91, 0.92, 0.93, 0.94, 0.95, 0.96, 0.97, 0.98, 0.99, or 1.0.

The second retardation layer has a slow axis and a fast axis present in a plane thereof. In one embodiment, the slow axis of the second retardation layer may be tilted at an angle of about 87° to about 93°, preferably about 890 to about 91°, assuming that the machine direction (MD) of the second retardation layer is disposed at an angle of 0°. Within this range, the second retardation layer can secure improvement in front contrast ratio. For example, the slow axis of the second retardation layer is tilted at an angle of about 87°, 88°, 89°, 90°, 91°, 92°, or 93°.

In one embodiment, the slow axis of the second retardation layer may be tilted at an angle of about −5° to about +5°, preferably about −3° to about +3°, more preferably about 0°, assuming that the slow axis of the first retardation layer is disposed at an angle of 0°. Within this range, the second retardation layer can improve the contrast ratio at all azimuth angles. For example, the slow axis of the second retardation layer may be tilted at an angle of about −5°, −4°, −3°, −2°, −1°, 0°, +1°, +2°, +3°, +4°, or +5°.

In one embodiment, the second retardation layer may be free from one or more heat stabilizers.

In the laminate of the first retardation layer and the second retardation layer, the sum of in-plane retardation value of the first retardation layer at a wavelength of 550 nm and in-plane retardation value of the second retardation layer at a wavelength of 550 nm may range from about 100 nm to about 110 nm, and the sum of out-of-plane retardation value of the first retardation layer at a wavelength of 550 nm and out-of-plane retardation value of the second retardation layer at a wavelength of 550 nm may range from about −30 nm to about +10 nm. When satisfying both the sum of the in-plane retardation values and the sum of the out-of-plane retardation values, the polarizing plate can secure a good diagonal compensation function of the polarizing plate when applied to an optical display apparatus, while improving thermal stability of the polarizing plate.

For example, in the laminate of the first retardation layer and the second retardation layer, the sum of in-plane retardation value of the first retardation layer at a wavelength of 550 nm and in-plane retardation value of the second retardation layer at a wavelength of 550 nm may be about 100 nm, 101 nm, 102 nm, 103 nm, 104 nm, 105 nm, 106 nm, 107 nm, 108 nm, 109 nm, or 110 nm.

For example, in the laminate of the first retardation layer and the second retardation layer, the sum of out-of-plane retardation value of the first retardation layer at a wavelength of 550 nm and out-of-plane retardation value of the second retardation layer at a wavelength of 550 nm may be about −30 nm, −29 nm, −28 nm, −27 nm, −26 nm, −25 nm, −24 nm, −23 nm, −22 nm, −21 nm, −20 nm, −19 nm, −18 nm, −17 nm, −16 nm, −15 nm, −14 nm, −13 nm, −12 nm, −11 nm, −10 nm, −9 nm, −8 nm, −7 nm, −6 nm, −5 nm, −4 nm, −3 nm, −2 nm, −1 nm, 0 nm, +1 nm, +2 nm, +3 nm, +4 nm, +5 nm, +6 nm, +7 nm, +8 nm, +9 nm, or +10 nm.

Specifically, the first retardation layer and the second retardation layer are stacked on one surface of the polarizer such that the entirety of the first retardation layer and the second retardation layer can realize the diagonal compensation function. To this end, it is necessary to adjust not only the indexes of refraction of the second retardation layer in the slow axis direction and the fast axis direction related to the in-plane retardation and the out-of-plane retardation, but also the thickness thereof. In addition, the thickness of the second retardation layer may be adjusted to improve thermal stability. The inventors of the present invention confirmed that, even in the structure where the second retardation layer includes the fluorene-based retardation layer, the polarizing plate suffers from deterioration in diagonal compensation function and thermal stability when the sum of in-plane retardation values of the first and second retardation layers and the sum of out-of-plane retardation values thereof are not within the scope of the present invention.

In one embodiment, the laminate of the first retardation layer and the second retardation layer in the polarizing plate may have an absolute value of variation in out-of-plane retardation value of about 10 nm or less, for example, about 0 nm to about 10 nm, as calculated by Equation 3, thereby improving thermal stability of the polarizing plate:

Absolute value of variation in out-of-plane retardation value=|$Rth$(0 hours)−$Rth$ (500 hours)|,     [Equation 3]

wherein Equation 3, Rth (0 hours) denotes out-of-plane retardation value (unit:nm) of the laminate of the first retardation layer and the second retardation layer in the polarizing plate at a wavelength of 550 nm, and Rth (500 hours) denotes out-of-plane retardation value (unit:nm) of the laminate of the first retardation layer and the second retardation layer in the polarizing plate at a wavelength of 550 nm, as measured after the polarizing plate is left at 60° C. and 95% RH for 500 hours.

For example, the laminate may have an absolute value of variation in out-of-plane retardation value of about 0 nm, 1 nm, 2 nm, 3 nm, 4 nm, 5 nm, 6 nm, 7 nm, 8 nm, 9 nm, or 10 nm, as calculated by Equation 3.

Preferably, the sum of in-plane retardation values ranges from 105 nm to 110 nm and the sum of out-of-plane retardation values ranges from −30 nm to +5 nm, −25 nm to +0 nm, −20 nm to −5 nm, or −10 nm to +10 nm, more preferably −10 nm to −5 nm.

Next, manufacture of the laminate of the first retardation layer and the second retardation layer will be described.

According to the present invention, the second retardation layer is directly stacked on the first retardation layer with no adhesive layer therebetween, thereby enabling reduction in thickness of the polarizing plate while easily achieving the sum of in-plane retardation values and the sum of out-of-plane retardation values described above and improving thermal stability.

In one embodiment, the laminate of the first retardation layer and the second retardation layer may be manufactured by coating a second retardation layer composition to a predetermined thickness on a non-stretched film or a partially stretched film for the first retardation layer, followed by stretching the entirety of the non-stretched film or the partially stretched film and the coating layer for the second retardation layer (such that an angle defined between the absorption axis of the polarizer and the slow axis of the first retardation layer becomes identical to an angle defined between the absorption axis of the polarizer and the slow axis of the second retardation layer).

In another embodiment, the laminate of the first retardation layer and the second retardation layer may be manufactured by coating a first retardation layer composition to a predetermined thickness on a non-stretched film or a partially stretched film for the second retardation layer, followed by stretching the entirety of the non-stretched film or the partially stretched film and the coating layer for the first retardation layer (such that an angle defined between the absorption axis of the polarizer and the slow axis of the first retardation layer becomes identical to an angle defined between the absorption axis of the polarizer and the slow axis of the second retardation layer).

In another embodiment, the polarizing plate may be fabricated by stretching the first retardation layer in the TD, attaching the stretched first retardation layer to the polarizer such that the slow axis of the first retardation layer is tilted at a right angle with respect to the absorption axis of the polarizer, stretching the second retardation layer in the MD (for example: a slow axis tilted at 90°), and attaching the second retardation layer to the first retardation layer through a roll-to-roll process.

Alternatively, the polarizing plate may be fabricated by stretching the second retardation layer in the MD, attaching the stretched second retardation layer to the polarizer such that the slow axis of the second retardation layer is tilted at a right angle with respect to the absorption axis of the polarizer, stretching the first retardation layer in the TD (for example: a slow axis tilted at 90°), and attaching the first retardation layer to the second retardation layer through a roll-to-roll process.

The polarizer 130 serves to convert natural light or polarized light into polarized light through linear polarization in a certain direction and may be produced from a polymer film essentially containing a polyvinyl alcohol resin. Specifically, the polarizer 130 may be produced by dyeing the polymer film with iodine or dichroic dyes, followed by stretching the film in the MD. Specifically, the polarizer may be produced through swelling, dyeing, stretching, and crosslinking.

The polarizer 130 may have a total light transmittance of about 43% or more, for example, about 43% to about 50%, and a degree of polarization of about 99% or more, for example, about 99% to about 100%. Within this range, the polarizer can improve antireflection performance of the polarizing plate through combination with the first retardation layer and the second retardation layer.

The polarizer 130 may have a thickness of about 2 μm to about 30 μm, specifically about 4 μm to about 25 μm. Within this range, the polarizer can be used in the polarizing plate.

In one embodiment, the first retardation layer may have a slow axis tilted at an angle of about 870 to about 930, preferably about 89° to about 91°, assuming that the absorption axis of the polarizer is disposed at an angle of 0°. Within this range, the polarizing plate can improve front contrast ratio. For example, the slow axis of the first retardation layer may be tilted at an angle of about 87°, 88°, 89°, 90°, 91°, 92°, or 93°.

In another embodiment, the second retardation layer may have a slow axis tilted at an angle of about 87° to about 93°, preferably about 89° to about 91°, assuming that the absorption axis of the polarizer is disposed at an angle of 0°. Within this range, the polarizing plate can perform the diagonal compensation function (reduction in brightness in lateral black viewing). For example, the slow axis of the second retardation layer may be tilted at an angle of about 87°, 88°, 89°, 90°, 91°, 92°, or 93°.

In one embodiment, an axis defined between the absorption axis of the polarizer and the slow axis of the first retardation layer may be identical to an axis defined between the absorption axis of the polarizer and the slow axis of the second retardation layer.

The protective film 140 is formed on an upper surface of the polarizer to protect the polarizer from an external environment while improving mechanical strength of the polarizing plate.

The protective film 140 serves to protect the polarizer from an external environment and may be an optically transparent film formed of, for example, at least one resin selected from among cellulose resins including triacetylcellulose (TAC) and the like, polyester resins including polyethylene terephthalate (PET), polybutylene terephthalate, polyethylene naphthalate, polybutylene naphthalate, and the like, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins. Specifically, the protective film may be a TAC film or a PET film.

The protective film 140 may have a thickness of about 5 μm to about 70 μm, specifically about 15 μm to about 45 μm. Within this range, the protective film can be used in the polarizing plate.

Although not shown in FIG. 1, a functional coating layer may be further formed on an upper surface of the protective film to provide additional functions to the polarizing plate. For example, the functional coating layer may include a hard coating layer, an anti-fingerprint layer, and an anti-reflection layer. These functional coating layers may be stacked alone or in combination thereof. The protective film may be attached to the polarizer via a bonding layer. The bonding layer may be formed of a water-based or UV curable bonding agent, without being limited thereto.

In addition, although not shown in FIG. 1, a protective film or a protective coating layer may be further formed between the polarizer 130 and the first retardation layer 110.

Further, although not shown in FIG. 1, a primer layer is further formed on one surface of each of the first retardation layer and the second retardation layer to improve adhesion between the retardation layers.

Next, a polarizing plate according to another embodiment of the present invention will be described.

According to this embodiment, the polarizing plate includes a polarizer, a protective film stacked on an upper surface of the polarizer, a second retardation layer stacked on a lower surface of the polarizer, and a first retardation layer stacked on a lower surface of the second retardation layer. The polarizing plate according to this embodiment is substantially the same as the polarizing plate shown in FIG. 1 except for the stacking sequence of the first retardation layer and the second retardation layer.

Next, an optical display apparatus according to the present invention will be described.

The optical display apparatus according to the present invention may include the polarizing plate according to the embodiments of the invention, and may include, for example, a liquid crystal display. The liquid crystal display may include a liquid crystal panel, a viewer-side polarizing plate stacked on a light exit surface of the liquid crystal panel, and a light source-side polarizing plate stacked on a light incidence surface of the liquid crystal panel. The polarizing plate according to the present invention may be used as the viewer-side polarizing plate or the light source side polarizing plate, preferably between a liquid crystal cell and a polarizing plate disposed in the same direction as an alignment direction of liquid crystals in the liquid crystal cell. When used as the light source-side polarizing plate, the polarizing plate according to the present invention can achieve further reduction in brightness in a black mode.

Figure 2:
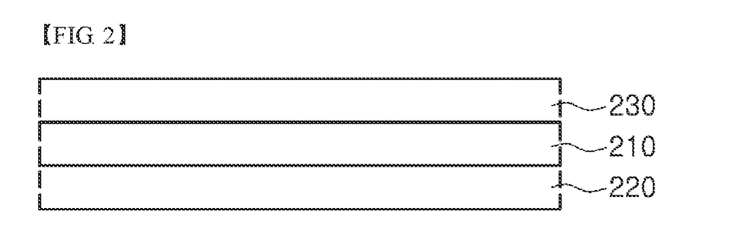
FIG. 2 is a sectional view of an optical display apparatus according to one embodiment of the present invention.

Referring to FIG. 2, an optical display apparatus according to one embodiment of the present invention will be described.

Referring to FIG. 2, the optical display apparatus includes a liquid crystal panel 210, a light source-side polarizing plate 220, and a viewer-side polarizing plate 230. Although not shown in FIG. 2, the optical display apparatus may include a backlight unit disposed below the light source-side polarizing plate and including a light source.

The liquid crystal panel may adopt a typical structure including an upper substrate, a liquid crystal layer and a lower substrate. The liquid crystal layer may include an in-plane switching (IPS) liquid crystal layer and a fringe field switching (FFS) liquid crystal layer, without being limited thereto.

The light source-side polarizing plate includes the polarizing plate according to the embodiments of the present invention. Although not shown in FIG. 2, a second retardation layer, a first retardation layer, a polarizer, and a protective film may be sequentially stacked on the liquid crystal panel. Alternatively, the first retardation layer, the second retardation layer, the polarizer, and the protective film may be sequentially stacked on the liquid crystal panel.

The viewer-side polarizing plate may include a polarizing plate well-known to those skilled in the art. For example, the polarizing plate may include a polarizer and protective films stacked on one or both surfaces of the polarizer.

MODE FOR INVENTION

Next, the present invention will be described in more detail with reference to examples. However, it should be noted that these examples are provided for illustration only and should not be construed in any way as limiting the invention.

Example 1

A polyvinyl alcohol film (PS #60, pre-stretching thickness: 60 μm, Kuraray Co., Ltd., Japan) was stretched to 6 times an initial length thereof in an aqueous solution of iodine at 55° C., thereby preparing a 12 sm thick polarizer having a transmittance of 45%.

A cyclic polyolefin film [RX4500, JSR] was used as a film for formation of a first retardation layer. A second retardation layer composition [OKP, Osaka Gas Chemicals Co., Ltd.] including 50 parts by weight of a fluorene-based ring-containing resin and 50 parts by weight of an aromatic polycarbonate relative to 100 parts by weight of the layer composition was prepared.

The second retardation layer composition was coated to a predetermined thickness on one surface of the first retardation layer, followed by drying and stretching, thereby forming a laminate including the second retardation layer directly formed on the first retardation layer. Re, Rth, NZ (at 550 nm), short wavelength dispersion, and long wavelength dispersion of each of the first retardation layer and the second retardation layer were measured using an AxoScan polarimeter (Axometrics Co., Ltd.).

As a protective film, a PET film was bonded to an upper surface of the polarizer and the laminate of the first retardation layer and the second retardation layer was stacked on a lower surface of the polarizer, thereby manufacturing a polarizing plate. In the polarizing plate, the first retardation layer and the second retardation layer were sequentially stacked on the polarizer. Here, the slow axis of the first retardation layer was parallel to the slow axis of the second retardation layer.

Example 2

A second retardation layer was formed through the same process as in Example 1 except that a film [OKP, Osaka Gas Chemicals Co., Ltd.] containing a fluorene-based ring-containing resin and an aromatic polycarbonate was used, and a first retardation layer was formed through the same process as in Example 1 except that a composition containing a cyclic olefin polymer resin [RX, JSR] was used.

The first retardation layer composition was coated to a predetermined thickness on one surface of the second retardation layer, followed by drying and stretching, thereby forming a laminate including the second retardation layer directly formed on the first retardation layer. Re, Rth, NZ (at 550 nm), short wavelength dispersion, and long wavelength dispersion of each of the first retardation layer and the second retardation layer were measured using an AxoScan polarimeter (Axometrics Co., Ltd.).

Example 3

A polarizing plate was fabricated through the same process as in Example 1 except that retardation and wavelength dispersion of each of a first retardation layer and a second retardation layer were changed as listed in Table 1.

Example 4

A polarizing plate was fabricated through the same process as in Example 1 except that a second retardation layer and a first retardation layer were sequentially stacked on a polarizer.

Comparative Examples 1 and 2

Polarizing plates were fabricated through the same process as in Example 1 except that retardation and wavelength dispersion of a second retardation layer were changed as listed in Table 2.

Comparative Example 3

A polarizing plate was fabricated through the same process as in Example 1 except that a second retardation layer was formed using an acrylic film [I-film, OPTES, Re: 55 nm, Rth: −135 nm, NZ: −2.0, nz>nx>ny, Re(450)/Re(550):1.1, Re(650)/Re(550):0.95] and was stacked on a first retardation layer.

The polarizing plates of Examples and Comparative Examples were evaluated as to the following properties and results are shown in Tables 1 and 2.

(1) Breakage of retardation layer: Breakage of the polarizing plates fabricated in Examples and Comparative Examples was evaluated. The laminate of the first retardation layer and the second retardation layer was cut into a cubic shape having a size of 10 cm×10 cm (length×width) and an adhesive tape (Ichibang, Nitto Co., Ltd.) was attached to one surface of the retardation layer in the polarizing plate. 10 vertical lines and 10 horizontal lines were drawn on the laminate of the first and second retardation layers to divide the laminate into a total of 100 pieces by cutting the laminate to a depth of the retardation layers. The number of pieces remaining on the polarizing plate was counted upon removal of the adhesive tape. A smaller number of pieces indicates less breakage of the retardation layers.

(2) Diagonal compensation function (unit: nit): Each of the polarizing plates fabricated in Examples and Comparative Examples was mounted on a light exit surface of an IPS liquid crystal panel (LTM270HL02, Samsung Electronics Co., Ltd.). Here, the polarizing plate was mounted on the light exit surface of the IPS liquid crystal panel such that the first retardation layer and the second retardation layer were placed thereon. A polarizing plate including a laminate of TAC-polarizer-TAC was mounted on a light incidence surface of the IPS liquid crystal panel. Brightness at an azimuth angle of 30° was measured in a black mode (dark state) at the same polar angle of 60°. In Table 1, a lower value indicates a better diagonal compensation function.

(3) Thermal stability (unit: nm): The laminate of the first retardation layer and the second retardation layer was left under conditions of 60° C. and 95% RH for 500 hours, followed by calculating a variation in out-of-plane retardation value |Rth (0 hours)−Rth (500 hours)| according to Equation 3.

TABLE 1

| | | Example | | | |
|---|---|---|---|---|---|
| | | 1 | 2 | 3 | 4 |
| First retardation layer | Re | 55 | 55 | 55 | 55 |
| | Rth | 125 | 125 | 120 | 125 |
| | NZ | 2.8 | 2.8 | 2.8 | 2.8 |
| | Short wavelength dispersion | 1.005 | 1.005 | 1.005 | 1.005 |
| | Long wavelength dispersion | 0.997 | 0.997 | 0.997 | 0.997 |
| | Thickness | 40 | 18 | 40 | 40 |
| Second retardation layer | Material | Fluorene-based | Fluorene-based | Fluorene-based | Fluorene-based |
| | Re | 55 | 55 | 53 | 55 |
| | Rth | −135 | −135 | −130 | −135 |
| | NZ | −2.0 | −2.0 | −1.8 | −2.0 |
| | Short wavelength dispersion | 1.16 | 1.14 | 1.1 | 1.16 |
| | Long wavelength dispersion | 0.93 | 0.94 | 0.95 | 0.93 |
| | Thickness | 20 | 40 | 20 | 20 |
| Sum of in-plane retardation values | | 110 | 110 | 108 | 110 |
| Sum of out-of-plane retardation values | | −10 | −10 | −10 | −10 |
| Breakage | | 0/100 | 0/100 | 0/100 | 0/100 |
| Diagonal compensation | | 0.0025 | 0.00248 | 0.00258 | 0.0032 |
| Thermal stability | | 5 | 5 | 5.5 | 5 |

TABLE 2

| | | Comparative Example | | |
|---|---|---|---|---|
| | | 1 | 2 | 3 |
| First retardation layer | Re | 55 | 55 | 55 |
| | Rth | 125 | 125 | 125 |
| | NZ | 2.8 | 2.8 | 2.8 |
| | Short wavelength dispersion | 1.005 | 1.005 | 1.005 |
| | Long wavelength dispersion | 0.997 | 0.997 | 0.997 |
| | Thickness | 40 | 40 | 40 |
| Second retardation layer | Material | Fluorene-based | Fluorene-based | Acryl |
| | Re | 10 | 100 | 55 |
| | Rth | −135 | −135 | −135 |
| | NZ | −13.0 | −0.9 | −2.0 |
| | Short wavelength dispersion | 1.16 | 1.16 | 1.1 |
| | Long wavelength dispersion | 0.93 | 0.93 | 0.95 |
| | Thickness | 20 | 20 | 35 |
| Sum of in-plane retardation values | | 65 | 155 | 110 |
| Sum of out-of-plane retardation values | | −10 | −10 | −10 |
| Breakage | | 0/100 | 0/100 | 50/100 |
| Diagonal compensation | | 0.11 | 0.13 | 0.17 |
| Thermal stability | | 5 | 5 | 30 |

*In Tables 1 and 2, the sum of in-plane retardation values indicates in-plane retardation value of the first retardation layer+in-plane retardation of the second retardation layer value.

*In Tables 1 and 2, the sum of out-of-plane retardation values indicates out-of-plane retardation value of the first retardation layer+out-of-plane retardation value of the second retardation layer.

*In Tables 1 and 2, the first retardation layers satisfy nx>ny>nz and the second retardation layers satisfy nz>nx>ny.

As shown in Table 1, the polarizing plates according to the present invention did not suffer from breakage of the retardation layers and secured good diagonal compensation function and thermal stability when applied to a liquid crystal display.

Conversely, as shown in Table 2, the polarizing plates of Comparative Examples 1 and 2 failing to satisfy the sum of in-plane retardation values of the first and second retardation layers according to the present invention suffered from significant deterioration in diagonal compensation function, as compared with the polarizing plates of Examples; and the polarizing plate of Comparative Example 3 including an acrylic retardation layer as the second retardation layer suffered from significant breakage of the retardation layer and deterioration in diagonal compensation function, as compared with the polarizing plates of Examples, and had poor thermal stability.

Although some embodiments have been described herein, it should be understood that various modifications, changes, alterations, and equivalent embodiments can be made by those skilled in the art without departing from the spirit and scope of the present invention.

The invention claimed is:

1. A polarizing plate comprising:
   a polarizer; and
   a laminate of a first retardation layer and a second retardation layer stacked on a lower surface of the polarizer,
   wherein the first retardation layer satisfies Equation 1 and the second retardation layer satisfies Equation 2:

$$nx>ny>nz,$$ [Equation 1]

wherein Equation 1, nx, ny and nz are indexes of refraction of the first retardation layer at a wavelength of 550 nm in a slow axis direction, a fast axis direction and a thickness direction thereof, $$nz>nx>ny,$$ [Equation 2]

wherein Equation 2, nx, ny and nz are indexes of refraction of the second retardation layer at a wavelength of 550 nm in a slow axis direction, a fast axis direction and a thickness direction thereof;
   a sum of in-plane retardation values of the first retardation layer and the second retardation layer at a wavelength of 550 nm ranges from about 100 nm to about 110 nm,
   a sum of out-of-plane retardation values of the first retardation layer and the second retardation layer at a wavelength of 550 nm ranges from about −30 nm to about +10 nm, and
   the second retardation layer comprises a fluorene-based retardation layer.

2. The polarizing plate according to claim 1, wherein the second retardation layer is directly formed on the first retardation layer.

3. The polarizing plate according to claim 1, wherein the second retardation layer has a slow axis tilted at an angle of about −5° to about +5°, when that the first retardation layer has a slow axis disposed at an angle of 0°.

4. The polarizing plate according to claim 1, wherein the second retardation layer has an in-plane retardation value of about 50 nm to about 60 nm and an out-of-plane retardation value of about −150 nm to about −120 nm at a wavelength of 550 nm.

5. The polarizing plate according to claim 1, wherein the second retardation layer has a degree of biaxiality of about −3 to about 0 at a wavelength of 550 nm.

6. The polarizing plate according to claim 1, wherein the second retardation layer satisfies relations: about $1.0 \leq Re(450)/Re(550) \leq$ about 1.2 and about $0.85 \leq Re(650)/Re(550) \leq$ about 1.0, where Re(450), Re(550), and Re(650) denote in-plane retardation values at wavelengths of 450 nm, 550 nm, and 650 nm, respectively.

7. The polarizing plate according to claim 1, wherein the second retardation layer has an nx value of about 1.59 to about 1.61, an ny value of about 1.59 to about 1.61, and an nz value of about 1.61 to about 1.63 in Equation 2.

8. The polarizing plate according to claim 1, wherein the second retardation layer comprises a fluorene-based ring-containing resin and an aromatic thermoplastic resin.

9. The polarizing plate according to claim 1, wherein the polarizer has a slow axis tilted at an angle of about 87° to about 93°, when that the polarizer has an absorption axis disposed at an angle of 0°.

10. The polarizing plate according to claim 1, wherein the first retardation layer has an in-plane retardation value of about 50 nm to about 60 nm and an out-of-plane retardation value of about 120 nm to about 150 nm at a wavelength of 550 nm.

11. The polarizing plate according to claim 1, wherein the first retardation layer satisfies relations: about $1.0 \leq Re(450)/Re(550) \leq$ about 1.2 and about $0.85 \leq Re(650)/Re(550) \leq$ about 1.0, where Re(450), Re(550), and Re(650) denote in-plane retardation values at wavelengths of 450 nm, 550 nm, and 650 nm, respectively.

12. The polarizing plate according to claim 1, wherein the first retardation layer comprises a cyclic olefin polymer film.

13. The polarizing plate according to claim 1, wherein the first retardation layer has an nx value of about 1.50 to about 1.55, an ny value of about 1.48 to about 1.53, and an nz value of about 1.48 to about 1.53 in Equation 1.

14. The polarizing plate according to claim 1, wherein the first retardation layer and the second retardation layer are sequentially stacked on the polarizer, or the second retardation layer and the first retardation layer are sequentially stacked on the polarizer.

15. The polarizing plate according to claim 1, further comprising:
   a protective film stacked on an upper surface of the polarizer.

16. An optical display apparatus comprising the polarizing plate according to claim 1.

17. The optical display apparatus according to claim 16, comprising:
   a liquid crystal panel; and
   the polarizing plate stacked on a light incidence surface of the liquid crystal panel.

* * * * *